(12) United States Patent
Takehara

(10) Patent No.: US 6,933,027 B2
(45) Date of Patent: Aug. 23, 2005

(54) COMPOSITE AND VESSELS INCLUDING THE COMPOSITE

(75) Inventor: Mamoru Takehara, Osaka (JP)

(73) Assignee: Takehara Can Co., LTD (JP)

( * ) Notice: Subject to any disclaimer, the term of this patent is extended or adjusted under 35 U.S.C. 154(b) by 0 days.

(21) Appl. No.: 10/469,115

(22) PCT Filed: Feb. 26, 2001

(86) PCT No.: PCT/JP01/01432

§ 371 (c)(1),
(2), (4) Date: Aug. 26, 2003

(87) PCT Pub. No.: WO02/068187

PCT Pub. Date: Sep. 6, 2002

(65) Prior Publication Data

US 2004/0071907 A1 Apr. 15, 2004

(51) Int. Cl.$^7$ ................................................. B32B 9/00
(52) U.S. Cl. ....................... 428/35.9; 428/164; 428/421
(58) Field of Search ................................ 428/35.9, 164, 428/421, 545, 573, 600, 602, 609, 615, 687; 427/323, 327, 436

(56) References Cited

U.S. PATENT DOCUMENTS 5,020,211 A * 6/1991 Nakagawa et al. ........... 29/596
5,389,436 A * 2/1995 Totsuka et al. ............. 428/327

FOREIGN PATENT DOCUMENTS

| EP | 0 591 531 A1 | 4/1994 |
| JP | 55-151921 A | 11/1980 |
| JP | 2-65543 A | 5/1990 |
| JP | 2-154713 A | 6/1990 |
| JP | 2-243113 A | 9/1990 |
| JP | 5-84136 A | 4/1993 |
| JP | 5-318654 A | 12/1993 |
| JP | 6-296549 A | 10/1994 |
| JP | 09-065977 A | 3/1997 |
| JP | 10-127491 A | 5/1998 |
| WO | WO 93/19935 A1 | 10/1993 |

* cited by examiner

Primary Examiner—Sandra M. Nolan-Rayford
(74) Attorney, Agent, or Firm—The Webb Law Firm

(57) ABSTRACT

A fluororesin coating includes in its surface (13) a fluororesin coating film (11) formed on a coating surface (6) of a metal substrate (6) forming a vessel (1). In surface portions of the fluororesin coating film (11), there are formed a plurality of compressed areas (15) arranged in distribution. Then, the fluororesin coating having the compressed areas (15) formed therein is provided on an inner face (2) of the vessel (1). As the surface (13) portions where the compressed areas (15) are present are smoothed out for obtaining gloss, deterioration of the mold releasing performance of the surface (13) can be prevented even in the event of insufficient heating during a drying process of the fluororesin coating film (11).

6 Claims, 7 Drawing Sheets eighty times large eighty times large five hundred times large five hundred times large

COMPOSITE AND VESSELS INCLUDING THE COMPOSITE

BACKGROUND OF THE INVENTION

1. Field of the Invention

The present invention relates to fluororesin coating formed on a coating surface of a metal substrate and also to a vessel having the fluororesin coating on its inner face.

2. Description of Related Art

Conventionally, as vessels for domestic or restaurant use as well as for use in the food processing industry, vessels having fluororesin coating on the surface of metal substrate have often been employed, because of their usefulness in preventing adhesion of contents to be stored therein or foodstuff to be cooked therein. Such vessels include various storage vessels, frying pans, saucepans, and cooking apparatuses such as a hot cooking plate. Hence, many of the contents or foodstuff stored or cooked therein tend to stick to the vessel surface. In order to avoid this, fluororesin coating is often formed on the inner face of the vessel, which coating provides superior heat resistance, corrosion resistance as well as good mold releasing property. Typically, the operation for forming this fluororesin coating is done by the spray coating method. And, in order to obtain better mold release property, it has been a common practice to effect a drying operation at a high temperature of 400° C. or higher for a period of about 10 minutes during the drying step for finishing the coating operation. That is, during this high-temperature drying step, a portion of the surface of the fluororesin coating is melted for smoothing out, thereby to provide gloss on the surface. This gloss represents smoothness of the surface, hence can be used as an indicator of the mold releasing property of the coating.

Incidentally, it is desired that such vessels as above are of light-weight. For this reason, aluminum is often employed as the metal substrate and the fluororesin coating is formed on the surface of this metal substrate as the coating surface. In such case, if the high-temperature operation at 400° C. or higher is effected as long as 10 minutes, the heating for such long period of time may result in deformation of the metal substrate, since the melting temperature of aluminum is in the vicinity of 500° C. The temperature employed at the drying process is elevated so high because of the heat resistance of the fluororesin coating. In view of this, it is undesirable to lower the drying temperature since this will result in insufficient smoothness in the coating surface. On the other hand, if the high temperature is maintained for such long time without lowering the drying temperature as described above, this may invite disadvantageous deformation of the metal substrate. Therefore, the standard practice has been to shorten the drying period to 2 to 4 minutes with which prevention of such deformation of the metal substrate is possible. As a result, the partial melting of the fluororesin coating surface by the high temperature drying process tends to be insufficient, hence, the resultant gloss being also insufficient.

For the reasons noted above, with the conventional vessels having fluororesin coating currently available on the market, the fluororesin coating used therein does not fully provide its intended mold releasing property.

In view of the above, an object of the present invention is to provide increased gloss to the fluororesin coating so that the coating may fully provide its mold releasing property, while avoiding deformation of the metal substrate due to high temperature heating thereof.

SUMMARY OF THE INVENTION

According to the characterizing feature of the present invention, a fluororesin coating comprises a fluororesin coating film formed on a coating surface of a metal substrate, wherein the fluororesin coating film includes, in its surface, a plurality of compressed areas distributed on the surface. With the presence of the plurality of compressed areas distributed, the surface of the fluororesin coating is smoothed out to obtain increased gloss, hence, improved mold releasing property as well.

Further, the fluororesin coating relating to the present invention, the compressed areas can be formed by press working. And, the compressed areas can be formed by a plurality of projections distributed over the coating surface of the metal substrate. When the plurality of distributed areas are pressed more strongly than the remaining areas of the surface, the entire substrate surface will be pressed and at the same time, with the compressed areas being subjected to the greater pressing force, so that the surface unevenness at the compressed areas will be collapsed and flattened out by the pressure, providing increased smoothness and gloss in the surface. And, these areas provided with such increased gloss will achieve improved mold releasing property, as compared with the surrounding surface areas.

The formation of such compressed areas is realized by increasing the reaction force on the back side of the fluororesin coating while surface-supporting the entire surface of the coating. Such increased reaction force can be obtained also by coating the fluororesin coating and projecting the coated surface of the coating. For example, projections can be formed in advance at a plurality of areas corresponding to the compressed areas on the coating surface of the metal substrate. Then, after forming the fluororesin coating uniformly over the coating surface, a surface pressure may be applied to the surface from the front side thereof. Alternatively, the fluororesin coating may be formed on a flat coating surface. Then, while surface-supporting this surface, pressure may be applied from the back side of the metal substrate in such a manner as to form local depressions or recesses at the positions corresponding to the compressed areas, whereby the coating surface of the metal substrate will project locally toward the fluororesin coating.

Further, according to the invention, on the back side of the metal substrate forming the fluororesin coating, a magnetic metal material layer made of a magnetic metal material may be laminated. And, the metal substrate can be made of aluminum.

The present invention relates also to a vessel including the above-described fluororesin coating on its inner face. And, the inner face of this vessel has the properties of the surface of the fluororesin coating described above.

BRIEF DESCRIPTION OF THE DRAWINGS

FIGS. 15 through 17 are further magnified electron microscopy images of the same.

DETAILED DESCRIPTION OF THE INVENTION

For describing the invention in greater details, there will be described, with reference to the accompanying drawings, an exemplary case in which a fluororesin coating is formed by press working technique.

Figure 1:
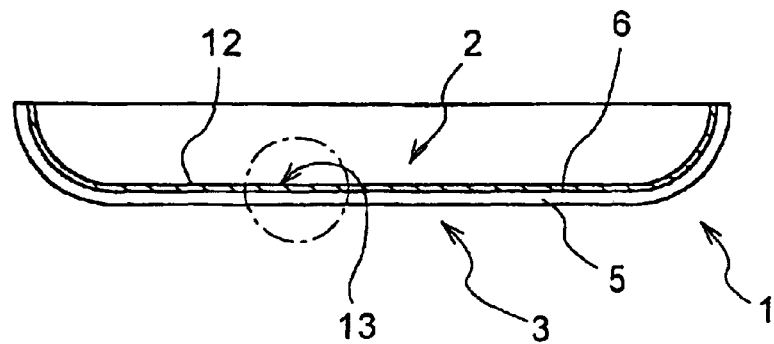
FIG. 1 is a vertical section showing one preferred embodiment of a vessel relating to the present invention.
Figure 2:
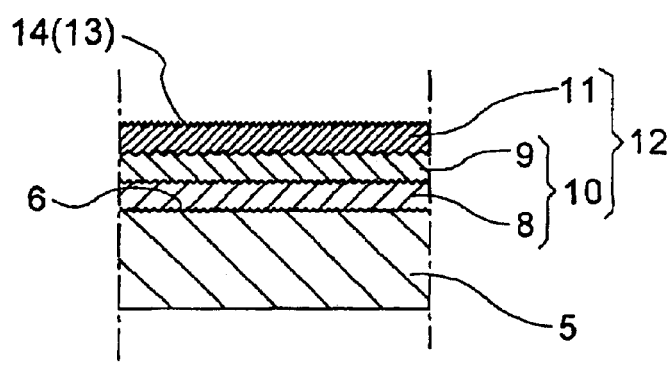
FIG. 2 is an enlarged section of principal portions for explaining its fluororesin coating.

FIG. 1 shows a vertical section of a frying pan as an example of the vessel. As shown in FIG. 2 which shows an enlarged section of its principal portions, on a coating surface 6 of a metal substrate 5 which can be made of e.g. aluminum, under the condition prior to the press working, there are formed, one on the other, a base coating layer 10 consisting of a primer layer 8 of 6 to 10 μm thickness for improving adhesion or bonding relative to the coating surface 6 which is subjected in advance to a surface treatment such as sandblast and of an intermediate primer layer 9 of 8 to 12 μm thickness for improving coating bonding of the fluororesin relative to the primer layer 8, and a fluororesin coating film 11 of 6 to 10 μm thickness laminated on the base coating layer 10. These layers together constitute a fluororesin coating 12. In a surface 13 of this fluororesin coating 12, there are formed a plurality of compressed areas distributed over the surface. At these compressed areas, the surface 13 is formed flat and smooth, thus adding gloss to the fluororesin coating 12.

Figure 3:
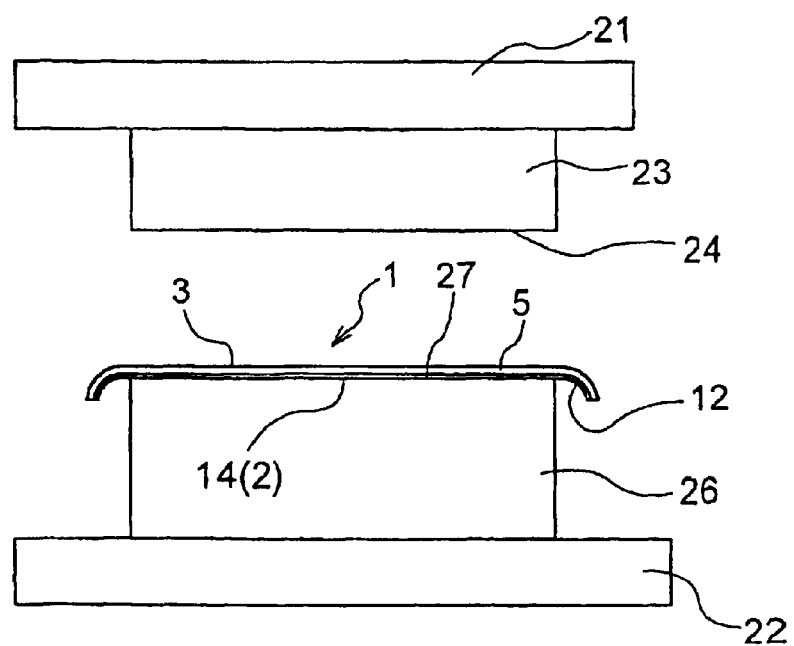
FIG. 3 is a vertical section for explaining a press working for forming the fluororesin coating relating to the present invention.

FIG. 3 shows a press machine employed in the press working for forming the fluororesin coating relating to this invention. This machine includes a lower mold 26 mounted to a press head 22 and an upper mold 23 mounted to an upper framework 21. In operation, the vessel 1 is placed on the top face, i.e. a lower working face 24, of the lower mold 26, with an inner face 2 of the vessel being oriented downward. Then, under this condition, the vessel 1 is pressed from its back side by the bottom face, i.e. the lower working face 24 of the upper mold 23. This vessel 1 includes in its inner face 2, the fluororesin coating 12 having on its surface 13 the fluororesin coating film 11 formed on the coating surface 6 of the metal substrate 5. An upper working face 27 of the lower mold 26 is formed flat and supports a flat face portion 14 formed in the inner face 2 of the vessel 1.

Figure 4:
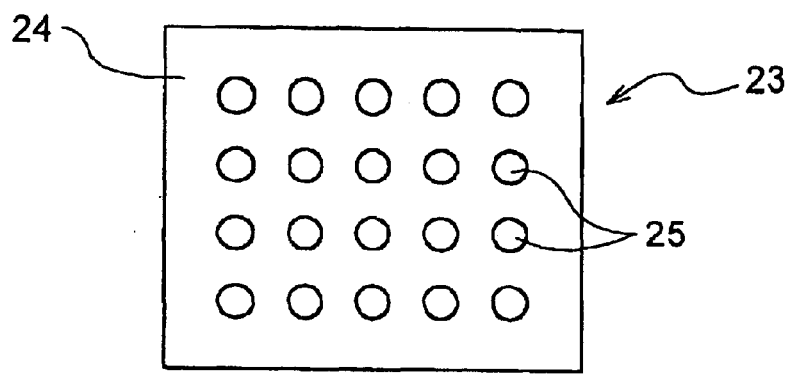
FIG. 4 is a plan view showing a pressing face of a press mold.
Figure 5:
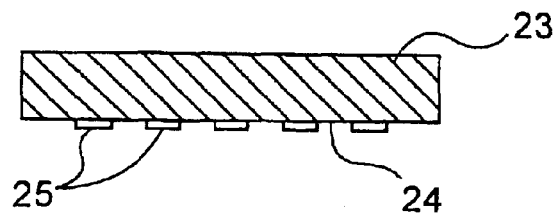
FIG. 5 is a side view of the mold.
Figure 6:
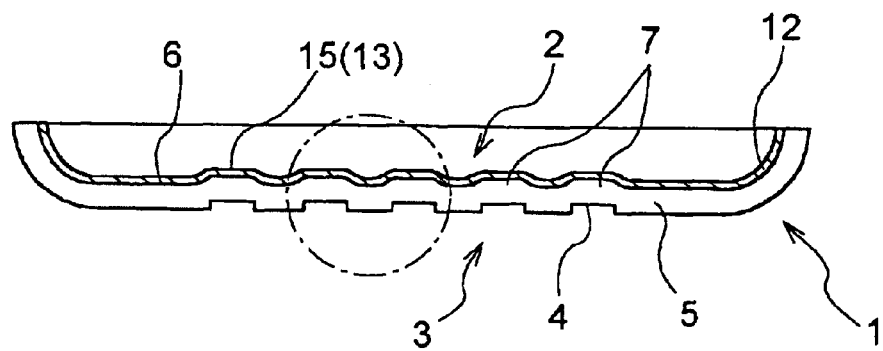
FIG. 6 is a vertical section showing an example of a vessel formed by using the mold.
Figure 7:
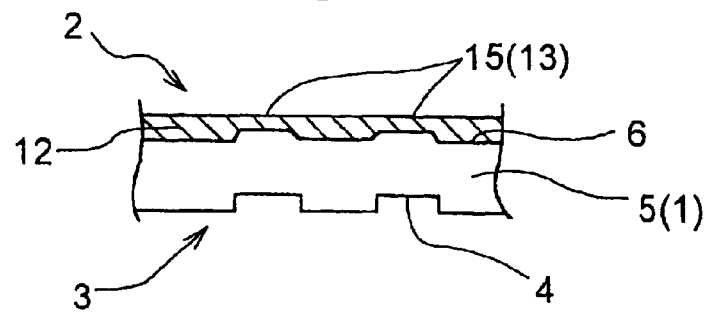
FIG. 7 is an enlarged section showing a condition of the fluororesin coating formed in the worked vessel.
Figure 8:
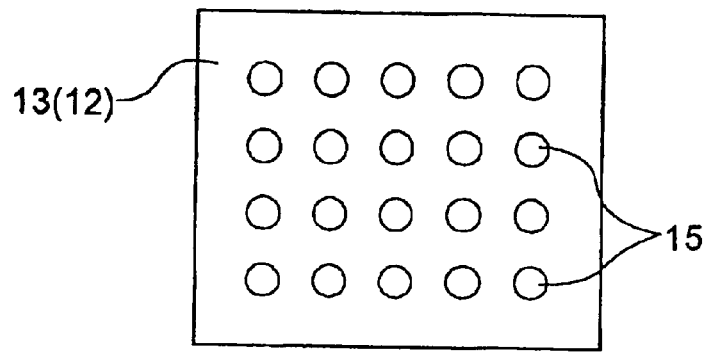
FIG. 8 is a plan view showing a surface of the fluororesin coating relating to the present invention.

FIG. 4 is a plan view of the lower working face 24 of the upper mold 23. This lower working face 24 of the upper mold 23 is formed flat and as shown in FIG. 5, includes, in its flat face, a plurality of pressing projections 25 for forming a plurality of compressed portions 15 in the surface 13 of the fluororesin coating 12 formed on the inner face 2 of the vessel 1, with the projections 25 being formed with a uniform height of 20 to 50 μm. Each pressing projection 25 is formed as a cylindrical portion having a diameter of 20 to 60 μm. When the vessel 1 is bound and pressed between the upper mold 23 and the lower mold 26, the projection will be pressed into an outer face 3 of the vessel 1, thereby to form a recess 4 in the metal substrate 5. These pressing projections 25, as shown, should preferably be arranged in a geometric pattern. If they are arranged in the form of a square lattice, the distributing arrangement thereof can be made more easily. The press-in depth of the pressing projection 25 into the outer face 3 of the vessel 1 is set to be 20 to 60 μm. With this press-in operation of the pressing projections 25, as shown in FIG. 6 as well as in FIG. 7 which is its enlarged partial view, a plurality of projections 7 are formed where the coating surface 6 of the metal substrate 5 is projected toward the fluororesin coating 12. As a result, the fluororesin coating 12 will be compressed between the projections 7 and the lower mold 26, thereby to form a plurality of compressed areas 15 corresponding to the plurality of projections 7. Consequently, as shown in FIG. 8, the plurality of compressed areas 15 are distributed over the surface of the fluororesin coating film 11 formed in this flat face portion 14. Incidentally, in FIGS. 6 and 7, the pressed-in depth of the recesses 4 and the projecting height of the projections 7 are shown with exaggeration. And, although FIG. 6 shows the surface 13 corresponding to the projections 7 as "projections", in reality, the surface does not substantially differ from the surface 13 shown as a flat face in FIG. 7. In a microscopic view, however, the surface of the compressed area 15 is often formed slightly higher than the other surrounding areas of the surface 13.

Figure 9:
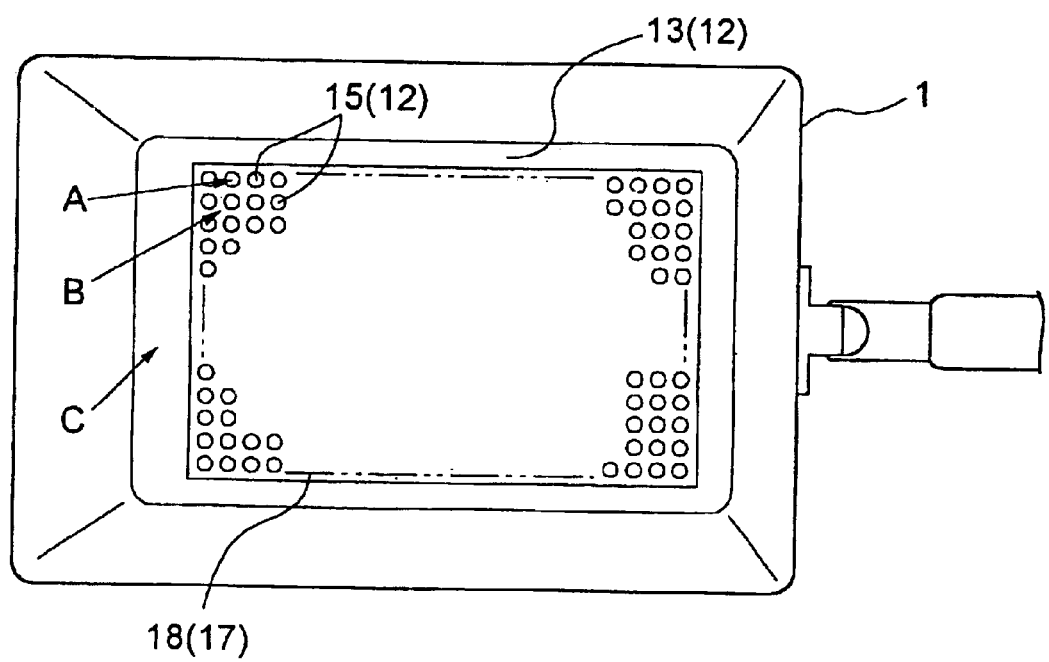
FIG. 9 is a plan view showing another example of the vessel relating to the invention.
Figure 10:
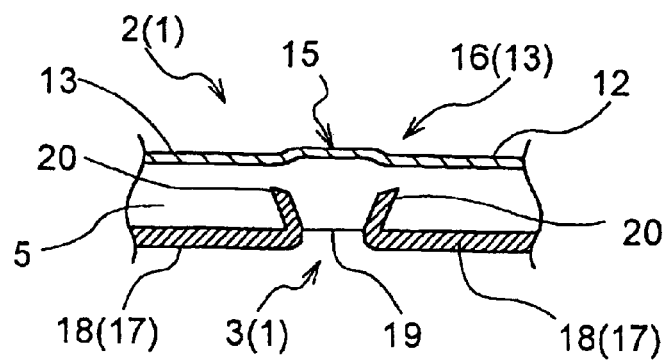
FIG. 10 is a vertical section of principal portions showing a fluororesin coating formed by a different method.

FIG. 9 shows another example of the vessel 1. In this example, the vessel 1 comprises a flat pan used as an egg roasting pan having a rectangular flat face portion 14. And, on the back side of the flat face portion 14, as a laminated magnetic metal material layer 17, there is affixed a rectangular stainless steel plate 18 of 0.3 to 0.5 mm thickness, so that this pan can be used with an electromagnetic cooker. In this stainless steel plate 18, as shown in FIG. 10, there are formed in advance in distribution a plurality of circular holes 19. And, a peripheral edge of each circular hole 19 is bent on one side in the flowering-like form. Whereby, a plurality of split-open cylindrical projections 20 each having a sharp end are formed. And, the lower working face 24 of the upper mold 23 shown in FIG. 3 is formed as a flat face and then the stainless steel plate 18 is placed on the vessel 1 with orienting the sharp ends of the split-open cylindrical projections 20 being oriented downward. Thereafter, the upper mold 23 is lowered onto this, so that the vessel 1 is pressed together with the stainless steel plate 18 between the lower mold 26 and the upper mold 23. As a result, as shown in FIG. 10, the sharp ends of the split-open cylindrical projections 20 will be pressed or sunk into the metal substrate 5 of the vessel 1 from the back side thereof, so that there is formed the vessel 1 affixed and integrated with the stainless steel plate 18, with the split-open cylindrical projections 20 being pressed or sunk in the metal substrate 5. This affixing technique involving forming of the split-open cylindrical projections 20 and subsequent press-in operation thereof into the metal substrate 5 was previously proposed by the present applicant (see Japanese Patent Application "Kokai" No.: Hei. 10-127491 for example).

In this case of pressing the split-open cylindrical projections 20 into the metal substrate 5 also, as shown, there are formed in distribution the plurality of projections 7 in the coating surface 6 of the metal substrate 5 according to the distribution pattern of the circular holes 19. And, with these projections 7, in the surface 13 of the fluororesin coating 12, as shown in FIG. 9, there are formed a plurality of distributed compressed areas 15.

Figure 11:
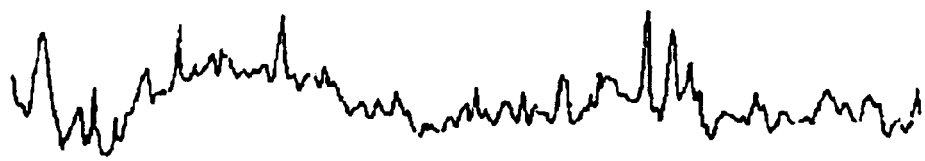
FIGS. 11 through 13 are diagrams of measurements of surface roughness of respective portions of the inner face of the vessel.
Figure 12:
Figure 13:
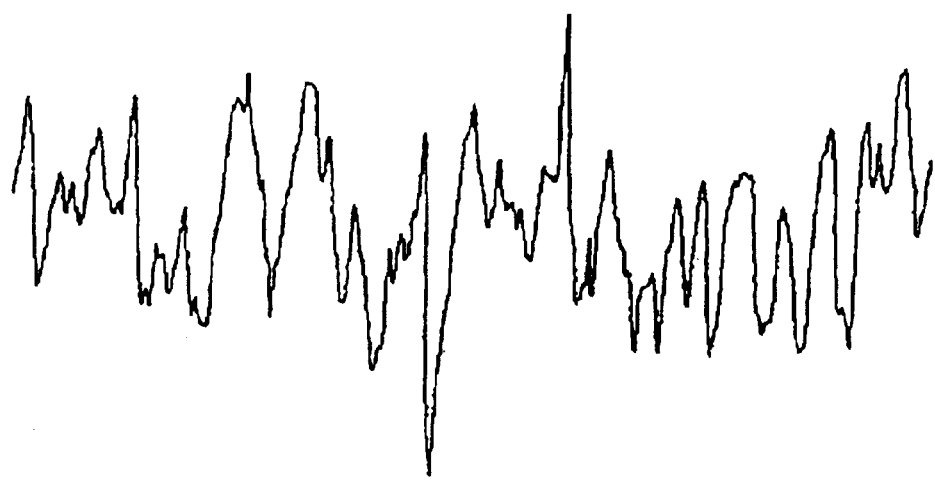

Comparative measurements of surface roughness were effected on portions of the inner face 2 of this flat pan. As the measurement positions, as shown in FIG. 9, an area A corresponding to the projection 7, an area B located between adjacent projections 7 and an area C located in an area where the stainless steel plate 18 is not affixed were chosen. According to the results of the measurements, the surface portion of the fluororesin coating film 11 located at the area A had high gloss. The surface portion of the fluororesin coating film 11 located at the area B had some gloss, but less gloss than the portion located at the area A. The surface portion of the fluororesin coating film 11 located at the area C had no gloss. Then, surface roughness measurements were done by using a surface roughness measuring device on the respective areas of the surface 13, whereby diagrams of FIGS. 11 through 13 were obtained. FIG. 11 shows the surface roughness measured of the surface 13 at the area A, with the measured average roughness being 1.15 $\mu$m. FIG. 12 shows the surface roughness measured of the surface 13 at the area B, with the measured average roughness being 2.06 $\mu$m. FIG. 13 shows the surface roughness measured of the surface 13 at the area C, with the measured average roughness being 4.40 $\mu$m. In making this flat pan, the fluororesin coating 12 comprising the respective layers described above was formed on the coating surface 6 of the metal substrate 5, then, the assembly was maintained for drying at a predetermined temperature of 400° C. or higher for a drying period which was reduced to 4 minutes or less. The results show that since the sprayed particles in forming the fluororesin coating film 11 retained their shape, the area C provided greater surface roughness.

Figure 14:
FIGS. 14 through 16 are electron microscopy images showing predetermined different portions of the inner face.
Figure 15:
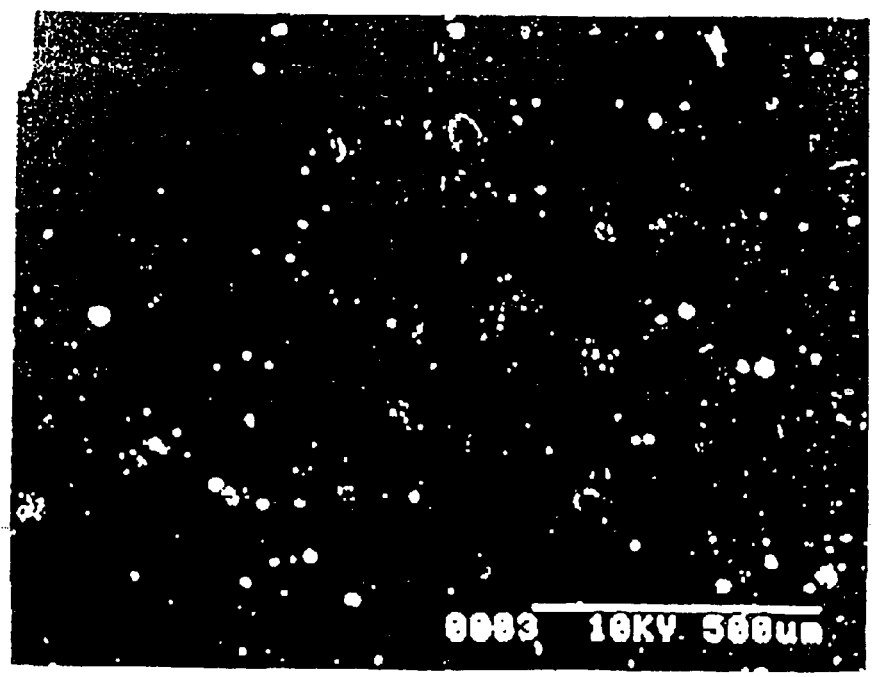
Figure 16:
Figure 17:
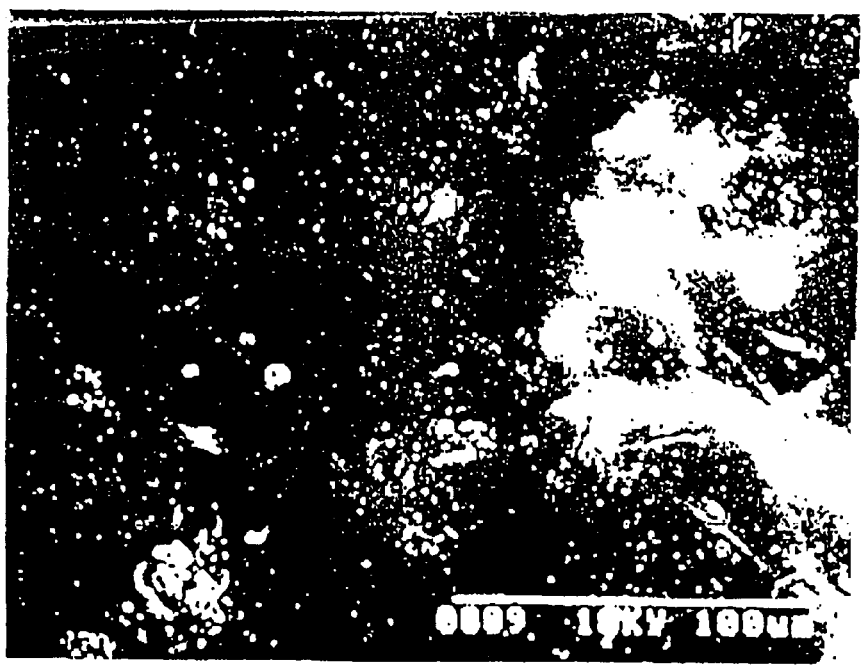

In order to study the condition of the surface of this fluororesin coating film 11, the surface conditions were observed using a scanning type electron microscope for the predetermined area A of the surface 13 located on the front side of the projection 7 and the predetermined area B of the surface 13 where no projection 7 is formed and which is located between the areas A. FIG. 14 is a magnified view of the predetermined surface 13 portion at the area A and FIG. 15 is a further magnified view of the condition with further magnification of the view of FIG. 14 by about 6 times. As shown, the surface 13 at this area A is dense and smoothed out. FIG. 16 is an enlarged view of the predetermined portion of the surface 13 located at the area B and FIG. 17 is a further, i.e. approximately six-times, magnified view of the same. As shown, the density of the this surface 13 portion is slightly inferior to that of the surface 13 portion at the area A, but this portion too is fairly smoothed out.

Accordingly, the surface 13 of the fluororesin coating 12 having the plurality of distributed compressed areas 15 provides improved mold releasing property as compared with the portions represented by the areas C where the laminated magnetic metal material 17 is not affixed to the back side thereof. This is because the portions having the plurality of distributed compressed areas 15 was compressed stronger than their peripheral or surrounding portions by the degree corresponding to the thickness of the stainless steel plate 18 affixed to the back side of the metal substrate 5 as the laminated magnetic metal material 17. That is to say, the mold releasing property can be improved even simply by applying a surface pressure to the surface 13 of the fluororesin coating 12.

The fluororesin coating described above can be formed in a manner described next. First, the coating surface 6 of the metal substrate 5 is subjected to a surface treatment for its roughing by means of e.g. sandblast. Next, to this coating surface 6, primer is applied to form a primer layer 8 and on this primer layer 8, an intermediate coating layer 9 is formed by coating, whereby a base coating layer 10 is formed. This base coating layer 10 can have a layer thickness of 10 to 25 $\mu$m. Then, on this base coating layer 10, fluororesin is applied to form the fluororesin coating film 11. This fluororesin coating film 11 can have a film thickness of 5 to 10 $\mu$m. Thereafter, the vessel 1 is charged into a drier or drying fluid is blown against the fluororesin coating film 11 from the front side thereof, thereby to dry the fluororesin coating. The drying temperature employed in this drying process is set to 400° C. or higher. Further, if the metal substrate 5 is made of such material as aluminum, having a relatively low melting point, the drying time is kept to be within 5 minutes. With this, thermal deformation of the metal substrate 5 can be avoided. On the other hand, with such decrease in the drying time period, there may result insufficient smoothing out of the surface 13 of the fluororesin coating.

Therefore, a mechanical pressure is applied to the surface 13 of the fluororesin coating 12. By the effect of this mechanical pressure, the compressed areas 15 are formed in the surface 13, thereby to improve the mold releasing property of the surface 13. It is desired that the mechanical pressure be applied in a uniformly distributed manner. One example of means provided for achieving this end was described hereinbefore. Namely, the upper working face 27 of the lower metal mold 26 is placed into face abutment against the flat face portion 14 of the surface 13. Then, the outer face 3 of the vessel 1 is pressed by means of the upper mold 23 having the plurality of pressing projections 25 uniformly distributed over the lower working face 24 flat surface, so that the pressing projections 25 will be pressed or sunk into the metal substrate 5 from the back side thereof, thereby to form the recesses 4. As the result of formation of the recesses 4 on the back side of the metal substrate 5 with the press-in operation of the pressing projections 25, in the coating surface 6, there are formed the plurality of projections 7 projecting toward the fluororesin coating film 11 in correspondence with the recesses 4. And, as the result of strong pressing between these projections 7 and the upper working face 27, there are formed the plurality of distributed compressed areas 15.

According to another example described also hereinbefore, the lower working face 24 is formed as a flat face and the laminated magnetic metal material 17 having the plurality of distributed split-open cylindrical projections 20 on the back face of the metal substrate 5 are set with placing the sharp ends of the split-open cylindrical projections 20 being placed in abutment against the back side of the metal substrate 5. Then, the pressing operation is effected from the top of this laminated magnetic metal material 17 by means of the upper metal mold 23. In this case, with the press-in movement of the split-open cylindrical projections 20, the plurality of projections 7 are formed on the coating surface 6 with the fluororesin coating 12 formed thereon. In this case too, as the result of strong mechanical press between these projections 7 and the upper working face 27, there are formed the plurality of distributed compressed areas 15.

Further alternatively, on the coating surface 6 of the metal substrate 5, there may be formed a plurality of projections 7 in distribution as those formed by the manners described above. In this case, the base coating layer 10 will be formed on the coating surface 6 having the plurality of projections 7 formed in advance thereof and then the fluororesin coating film 11 will be formed thereon. Then, this assembly is subjected to the drying process. The conditions to be used for this drying process will be same as those described hereinbefore. Thereafter, the vessel 1 after being subjected to the drying process will then be subjected to the pressing process between the upper and lower metal molds both of which are formed as flat working faces. As a result, the fluororesin coating film 11 will be strongly pressed between the projections 7 and the metal molds, whereby the compressed areas will be formed at the areas where the projections 7 are formed.

Figure 18:
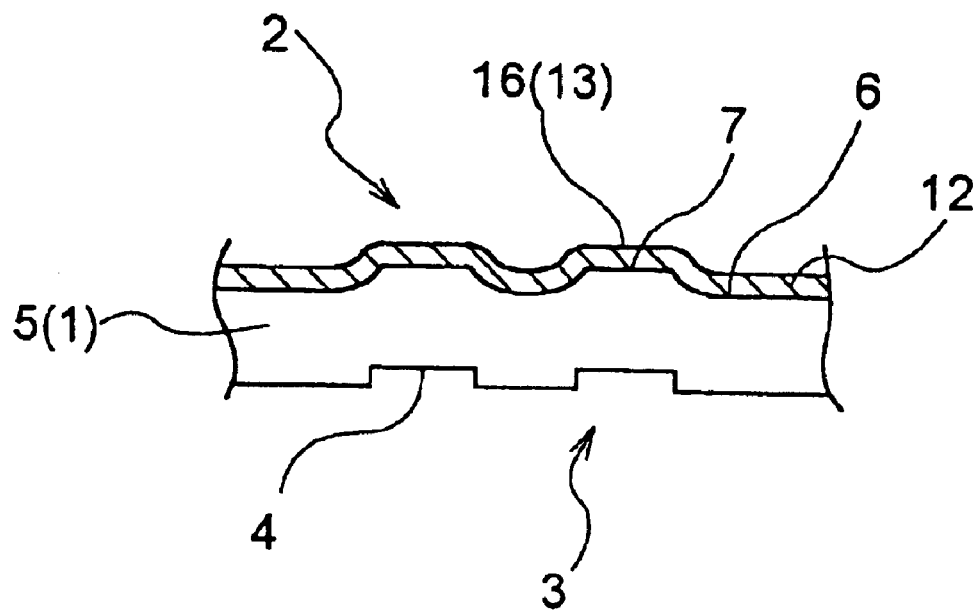
FIG. 18 is a vertical section of principal portions showing a further condition of the fluororesin coating formed on a vessel.

Incidentally, during the pressing operation, as shown in FIG. 18 showing the unevenness in exaggeration, the front side of the fluororesin coating film 11 corresponding to the projections 7 may sometimes be projected slightly to form projecting surface portions 16. This, however, does not impair the mold releasing property of the surface 13 of the fluororesin coating 12. Further, the size of the compressed area 15 is not limited to the diameter of about 50 μm described in the example, but can be a few millimeters or a few tens of millimeters. In such case too, the mold releasing property will not be inferior.

As described above, with the fluororesin coating and the vessel having the fluororesin coating in its inner face both relating to the present invention, the surface of the fluororesin coating is smoothed out for providing improved mold releasing performance. Hence, they can be used advantageously for storing or cooking e.g. foodstuff which tends to stick to the inner face. Especially, in case the metal substrate is made of a material such as aluminum having a relatively low melting point, it is possible to avoid deterioration of the mold releasing performance, while preventing deformation due to heating of such metal substrate.

What is claimed is:

1. A composite comprising:

a metal substrate having a coating surface and a back face;

a fluororesin coating film formed on the coating surface of the metal substrate; and a magnetic metal material laminated on the back face of the metal substrate, wherein the fluororesin coating film includes a plurality of compressed areas distributed on a surface thereof, and the plurality of compressed areas are formed by press working after the fluororesin coating film is formed on the coating surface.

2. The composite according to claim 1, wherein a plurality of projections are formed in distribution over the coating surface of the metal substrate and the plurality of compressed areas are formed in correspondence with the plurality of projections.

3. The composite according to claim 1, wherein the fluororesin coating film is formed on the coating surface of the metal substrate formed of aluminum.

4. A vessel comprising the composite of claim 1.

5. A vessel comprising the composite of claim 2.

6. A vessel comprising the composite of claim 3.

* * * * *